(12) United States Patent
Morris (10) Patent No.: US 12,551,537 B2
(45) Date of Patent: Feb. 17, 2026

(54) METHODS AND COMPOSITIONS FOR THE TREATMENT AND PREVENTION OF TYPE 1 DIABETES

(71) Applicant: Dr. Mary Morris & Associates, LLC, Onalaska, WI (US)

(72) Inventor: Mary S. Morris, Onalaska, WI (US)

(73) Assignee: Dr. Mary Morris & Associates, LLC, Onalaska, WI (US)

( * ) Notice: Subject to any disclaimer, the term of this patent is extended or adjusted under 35 U.S.C. 154(b) by 873 days.

(21) Appl. No.: 17/778,624

(22) PCT Filed: Nov. 25, 2020

(86) PCT No.: PCT/US2020/062159
§ 371 (c)(1),
(2) Date: May 20, 2022

(87) PCT Pub. No.: WO2021/113136
PCT Pub. Date: Jun. 10, 2021

(65) Prior Publication Data
US 2023/0018324 A1     Jan. 19, 2023

Related U.S. Application Data

(60) Provisional application No. 62/944,503, filed on Dec. 6, 2019.

(51) Int. Cl.
*A61K 38/28* (2006.01)
*A61K 9/00* (2006.01)
*A61P 3/10* (2006.01)

(52) U.S. Cl.
CPC .............. *A61K 38/28* (2013.01); *A61K 9/006* (2013.01); *A61P 3/10* (2018.01)

(58) Field of Classification Search
None
See application file for complete search history.

(56) References Cited

U.S. PATENT DOCUMENTS

| | | | |
|---|---|---|---|
| 5,487,898 | A | 1/1996 | Lu et al. |
| 2005/0039235 | A1 | 2/2005 | Moloney et al. |
| 2005/0214251 | A1* | 9/2005 | Pohl .................. A61K 9/006 514/5.9 |
| 2006/0079453 | A1 | 4/2006 | Sidney et al. |
| 2007/0027063 | A1 | 2/2007 | Boss et al. |
| 2007/0190045 | A1 | 8/2007 | Herold et al. |
| 2016/0339084 | A1* | 11/2016 | Becker .................. A61K 38/26 |

FOREIGN PATENT DOCUMENTS

| | | | | |
|---|---|---|---|---|
| CA | 3092170 | A1 | 9/2018 | |
| CN | 110366412 | A | 10/2019 | |
| DE | 20021079 | U1 * | 3/2001 | ............ A61K 47/10 |
| JP | 2007-528902 | A | 10/2007 | |
| JP | 2015-514126 | A | 5/2015 | |
| WO | WO-2006/132530 | A2 | 12/2006 | |
| WO | WO-2012104834 | A1 * | 8/2012 | ............ C07K 14/62 |
| WO | WO-2013/156467 | A1 | 10/2013 | |
| WO | WO-2017/122180 | A1 | 7/2017 | |
| WO | WO-2018/157202 | A1 | 9/2018 | |
| WO | WO-2018/234493 | A1 | 12/2018 | |
| WO | WO-2019/050465 | A1 | 3/2019 | |
| WO | WO-2022/076385 | A1 | 4/2022 | |

OTHER PUBLICATIONS

Wong et al. "Oral delivery of insulin for treatment of diabetes: status quo, challenges and opportunities" J. Pharmacy and Pharmacology 68:1093-1108. (Year: 2016).*
Nguyen S and Schlosser R "Assessment of palatability of two sublingual diluents in allergic patients: a prospective pilot study" Am. J. Rhinol. Allergy 25:342-345. (Year: 2011).*
International Search Report and Written Opinion regarding Appl. No. PCT PCT/US2021/053537, mail date Dec. 29, 2021, 10 pps.
Harrison, et al. "Pancreatic Beta-Cell Function and Immune Responses to Insulin After Administration of Intranasal Insulin to Humans At Risk for Type 1 Diabetes." Diabetes Care. Oct. 2004, vol. 27, No. 10, pp. 2348-2355.
Jin, et al. "Sublingual Immunotherapy Dosing Regimens: What is Ideal?" J Allergy Clin Immunol Pract. Jan./Feb. 2017, vol. 5, No. 1, pp. 1-10.
Yasuyuki Ishii "Infection, Inflammation and Immunity: Various antigen-specific therapeutic vaccines for autoimmune diseases and allergies", vol. 41, No. 4, Winter 2011, Issued: Jan. 20, 2012 (Selection No. 190).
Hashem, M. A., et al. "Evolutionary Relationship of Genomic Insulin Sequence in Different Mammalian Species: A Computational Approach." Ecology and Evolutionary Biology, 2016, vol. 1, No. 2, pp. 23-28.
Hirsch, D. "Antigen-based immunotherapy for autoimmune disease: current status," ImmunoTargets and Therapy. Dec. 16, 2014, No. 4, pp. 1-11.
Kahanovitz, et al., "Type 1 Diabetes—A Clinical Perspective," Point Care. Mar. 2017, vol. 16, No. 1, pp. 1-9.
Kroger, et al., "Therapies to Suppress ß Cell Autoimmunity in Type 1 Diabetes," Front. Immunol., Aug. 16, 2018, vol. 9, No. 1891, pp. 1-14.
Leighton, et al., "A Practical Review of C-Peptide Testing in Diabetes," Diabetes Ther. 2017, No. 8, pp. 475-487.
Peakman, et al., "Antigen-Specific Immunotherapy for Type 1 Diabetes: Maximizing the Potential," Perspectives in Diabetes. Sep. 1, 2010, vol. 59, No. 9, pp. 2087-2093.

(Continued)

*Primary Examiner* — Sudhakar Katakam
*Assistant Examiner* — Zachary J Miknis
(74) *Attorney, Agent, or Firm* — FOLEY & LARDNER LLP (57) ABSTRACT

The disclosure provides methods of preventing or treating Type 1 diabetes in a mammalian subject, reducing risk factors associated with Type 1 diabetes, and/or reducing the likelihood or severity of Type 1 diabetes. A method of attenuating an antigenic response in a mammal to at least one Type 1 diabetes related-antigen is also provided. The methods include sublingually administering an effective amount of an insulin-related peptide to a subject.

10 Claims, 1 Drawing Sheet
Specification includes a Sequence Listing.

(56) References Cited

OTHER PUBLICATIONS

Smith, L., "Species variation in the amino acid sequence of insulin," The American Journal of Medicine, 1966, vol. 40, No. 5, pp. 662-666.
The American Diabetes Association, "2. Classification and Diagnosis of Diabetes: Standards of Medical Care in Diabetes—2019," Diabetes Care 2019; vol. 42, Suppl. 1, pp. S13-S28.
Van Belle, et al., "Type 1 Diabetes: Etiology, Immunology, and Therapeutic Strategies," Physiol. Rev. Jan. 2011, vol. 91: 79-118.
Wan, et al., "Class-switched anti-insulin antibodies originate from unconventional antigen presentation in multiple lymphoid sites," The Journal of Experimental Medicine. 2016, vol. 213, No. 6, pp. 967-978.
International Search Report and Written Opinion on Int'l. Appl. No. PCT PCT/US2020/062159, DTD Apr. 14, 2021, 14 pps.
Vehik et al., "Long-term outcome of individuals treated with oral insulin: Diabetes prevention trial-type 1 (DPT-1) oral insulin trial." Diabetes Care. Jul. 2011, vol. 34, No. 7, pp. 1585-1590.
Al-Waili "Sublingual Human Insulin for Hyperglycaemia in Type I Diabetes." JPMA, Jan. 1, 1999, vol. 49, No. 7, pp. 167-169.
Bergman et al. "Tolerogenic insulin peptide therapy precipitates type 1 diabetes." May 23, 2017, vol. 214, No. 7, pp. 2153-2156.
Daniel et al. "Prevention of type 1 diabetes in mice by tolerogenic vaccination with a strong agonist insulin mimetope." J. of Experimental Med. Jun. 20, 2011, vol. 208, pp. 1501-1510.
Patil et al. "Insulin-loaded alginic acid nanoparticles for sublingual delivery." Drug Delivery, Jun. 5, 2014, vol. 23, No. 5, pp. 429-436.
Rasheeduddin et al. "Immunologic Desensitisation of Allergens and its Impact on Insulin Use in Type 1 Diabetes Mellitus: A Case Report." J. of Clin. Diag. Res. 2023, vol. 17, No. 5, pp. 1-3.
Saporta "Sublingual Immunotherapy: A Useful Tool for the Allergist in Private Practice." Biomed Res. Int'l. Jan. 1, 2016, vol. 2016, pp. 1-6.
Khan, et al. "Sublingual tablets and the benefits of the sublingual route of administration." Journal of Pharmaceutical Research 16.3 (2017): 257-267.
Narang, et al. "Sublingual mucosa as a route for systemic drug delivery." Int J Pharm Pharm Sci 3.Suppl 2 (2011): 18-22.

\* cited by examiner

SEQUENCE LISTING

<160> NUMBER OF SEQ ID NOS: 24

<210> SEQ ID NO 1
<211> LENGTH: 30
<212> TYPE: PRT
<213> ORGANISM: Homo sapiens

<400> SEQUENCE: 1

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Thr
            20                  25                  30

<210> SEQ ID NO 2
<211> LENGTH: 21
<212> TYPE: PRT
<213> ORGANISM: Homo sapiens

<400> SEQUENCE: 2

Gly Ile Val Glu Gln Cys Cys Thr Ser Ile Cys Ser Leu Tyr Gln Leu
1               5                   10                  15

Glu Asn Tyr Cys Asn
            20

<210> SEQ ID NO 3
<211> LENGTH: 21
<212> TYPE: PRT
<213> ORGANISM: Homo sapiens

<400> SEQUENCE: 3

Leu Cys Gly Ser His Leu Val Glu Ala Leu Tyr Leu Val Cys Gly Glu
1               5                   10                  15

Arg Gly Phe Phe Tyr
            20

<210> SEQ ID NO 4
<211> LENGTH: 15
<212> TYPE: PRT
<213> ORGANISM: Homo sapiens

<400> SEQUENCE: 4

Cys Cys Thr Ser Ile Cys Ser Leu Tyr Gln Leu Glu Asn Tyr Cys
1               5                   10                  15

<210> SEQ ID NO 5
<211> LENGTH: 20
<212> TYPE: PRT
<213> ORGANISM: Homo sapiens

<400> SEQUENCE: 5

-continued

Gly Ile Val Glu Gln Cys Cys Thr Ser Ile Cys Ser Leu Tyr Gln Leu
1               5                   10                  15

Glu Asn Tyr Cys
            20

<210> SEQ ID NO 6
<211> LENGTH: 17
<212> TYPE: PRT
<213> ORGANISM: Homo sapiens

<400> SEQUENCE: 6

Glu Gln Cys Cys Thr Ser Ile Cys Ser Leu Tyr Gln Leu Glu Asn Tyr
1               5                   10                  15

Cys

<210> SEQ ID NO 7
<211> LENGTH: 24
<212> TYPE: PRT
<213> ORGANISM: Homo sapiens

<400> SEQUENCE: 7

Asn Gln His Leu Cys Gly Ser His Leu Val Glu Ala Leu Tyr Leu Val
1               5                   10                  15

Cys Gly Glu Arg Gly Phe Phe Tyr
            20

<210> SEQ ID NO 8
<211> LENGTH: 24
<212> TYPE: PRT
<213> ORGANISM: Homo sapiens

<400> SEQUENCE: 8

Gln His Leu Cys Gly Ser His Leu Val Glu Ala Leu Tyr Leu Val Cys
1               5                   10                  15

Gly Glu Arg Gly Phe Phe Tyr Thr
            20

<210> SEQ ID NO 9
<211> LENGTH: 20
<212> TYPE: PRT
<213> ORGANISM: Homo sapiens

<400> SEQUENCE: 9

Cys Gly Ser His Leu Val Glu Ala Leu Tyr Leu Val Cys Gly Glu Arg
1               5                   10                  15

Gly Phe Phe Tyr
            20

<210> SEQ ID NO 10
<211> LENGTH: 86
<212> TYPE: PRT
<213> ORGANISM: Homo sapiens

<400> SEQUENCE: 10

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Thr Arg Arg
                20                  25                  30

Glu Ala Glu Asp Leu Gln Val Gly Gln Val Glu Leu Gly Gly Gly Pro
            35                  40                  45

Gly Ala Gly Ser Leu Gln Pro Leu Ala Leu Glu Gly Ser Leu Gln Lys

```
Arg Gly Ile Val Glu Gln Cys Cys Thr Ser Ile Cys Ser Leu Tyr Gln
65                  70                  75                  80

Leu Glu Asn Tyr Cys Asn
                85

<210> SEQ ID NO 11
<211> LENGTH: 86
<212> TYPE: PRT
<213> ORGANISM: Unknown
<220> FEATURE:
<223> OTHER INFORMATION: Description of Unknown:
      Great ape insulin sequence

<400> SEQUENCE: 11

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Thr Arg Arg
                20                  25                  30

Glu Ala Glu Asp Leu Gln Val Gly Gln Val Glu Leu Gly Gly Gly Pro
            35                  40                  45

Gly Ala Gly Ser Leu Gln Pro Leu Ala Leu Glu Gly Ser Leu Gln Lys
        50                  55                  60

Arg Gly Ile Val Glu Gln Cys Cys Thr Ser Ile Cys Ser Leu Tyr Gln
65                  70                  75                  80

Leu Glu Asn Tyr Cys Asn
                85

<210> SEQ ID NO 12
<211> LENGTH: 86
<212> TYPE: PRT
<213> ORGANISM: Macaca fascicularis

<400> SEQUENCE: 12

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Thr Arg Arg
                20                  25                  30

Glu Ala Glu Asp Pro Gln Val Gly Gln Val Glu Leu Gly Gly Gly Pro
            35                  40                  45

Gly Ala Gly Ser Leu Gln Pro Leu Ala Leu Glu Gly Ser Leu Gln Lys
        50                  55                  60

Arg Gly Ile Val Glu Gln Cys Cys Thr Ser Ile Cys Ser Leu Tyr Gln
65                  70                  75                  80

Leu Glu Asn Tyr Cys Asn
                85

<210> SEQ ID NO 13
<211> LENGTH: 86
<212> TYPE: PRT
<213> ORGANISM: Unknown
<220> FEATURE:
<223> OTHER INFORMATION: Description of Unknown:
      Rabbit insulin sequence

<400> SEQUENCE: 13

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Ser Arg Arg
                20                  25                  30
```

```
Glu Val Glu Glu Leu Gln Val Gly Gln Ala Glu Leu Gly Gly Gly Pro
            35                  40                  45

Gly Ala Gly Gly Leu Gln Pro Ser Ala Leu Glu Leu Ala Leu Gln Lys
        50                  55                  60

Arg Gly Ile Val Glu Gln Cys Cys Thr Ser Ile Cys Ser Leu Tyr Gln
65                  70                  75                  80

Leu Glu Asn Tyr Cys Asn
                85

<210> SEQ ID NO 14
<211> LENGTH: 86
<212> TYPE: PRT
<213> ORGANISM: Canis sp.

<400> SEQUENCE: 14

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Ala Arg Arg
            20                  25                  30

Glu Val Glu Asp Leu Gln Val Arg Asp Val Glu Leu Ala Gly Ala Pro
            35                  40                  45

Gly Glu Gly Gly Leu Gln Pro Leu Ala Leu Glu Gly Ala Leu Gln Lys
        50                  55                  60

Arg Gly Ile Val Glu Gln Cys Cys Thr Ser Ile Cys Ser Leu Tyr Gln
65                  70                  75                  80

Leu Glu Asn Tyr Cys Asn
                85

<210> SEQ ID NO 15
<211> LENGTH: 86
<212> TYPE: PRT
<213> ORGANISM: Equus sp.
<220> FEATURE:
<221> NAME/KEY: MOD_RES
<222> LOCATION: (31)..(32)
<223> OTHER INFORMATION: Any amino acid
<220> FEATURE:
<221> NAME/KEY: MOD_RES
<222> LOCATION: (64)..(65)
<223> OTHER INFORMATION: Any amino acid

<400> SEQUENCE: 15

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Ala Xaa Xaa
            20                  25                  30

Glu Ala Glu Asp Pro Gln Val Gly Glu Val Glu Leu Gly Gly Gly Pro
            35                  40                  45

Gly Leu Gly Gly Leu Gln Pro Leu Ala Leu Ala Gly Pro Gln Gln Xaa
        50                  55                  60

Xaa Gly Ile Val Glu Gln Cys Cys Thr Gly Ile Cys Ser Leu Tyr Gln
65                  70                  75                  80

Leu Glu Asn Tyr Cys Asn
                85

<210> SEQ ID NO 16
<211> LENGTH: 84
<212> TYPE: PRT
<213> ORGANISM: Sus scrofa
```

```
<400> SEQUENCE: 16

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Ala Arg Arg
            20                  25                  30

Glu Ala Glu Asn Pro Gln Ala Gly Ala Val Glu Leu Gly Gly Gly Leu
        35                  40                  45

Gly Gly Leu Gln Ala Leu Ala Leu Glu Gly Pro Pro Gln Lys Arg Gly
    50                  55                  60

Ile Val Glu Gln Cys Cys Thr Ser Ile Cys Ser Leu Tyr Gln Leu Glu
65                  70                  75                  80

Asn Tyr Cys Asn

<210> SEQ ID NO 17
<211> LENGTH: 86
<212> TYPE: PRT
<213> ORGANISM: Unknown
<220> FEATURE:
<223> OTHER INFORMATION: Description of Unknown:
      Hamster insulin sequence

<400> SEQUENCE: 17

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Ser Arg Arg
            20                  25                  30

Gly Val Glu Asp Pro Gln Val Ala Gln Leu Glu Leu Gly Gly Gly Pro
        35                  40                  45

Gly Ala Asp Asp Leu Gln Thr Leu Ala Leu Glu Val Ala Gln Gln Lys
    50                  55                  60

Arg Gly Ile Val Asp Gln Cys Cys Thr Ser Ile Cys Ser Leu Tyr Gln
65                  70                  75                  80

Leu Glu Asn Tyr Cys Asn
                85

<210> SEQ ID NO 18
<211> LENGTH: 86
<212> TYPE: PRT
<213> ORGANISM: Rattus sp.

<400> SEQUENCE: 18

Phe Val Lys Gln His Leu Cys Gly Ser His Leu Val Glu Ala Leu Tyr
1               5                   10                  15

Leu Val Cys Gly Glu Arg Gly Phe Phe Tyr Thr Pro Met Ser Arg Arg
            20                  25                  30

Glu Val Glu Asp Pro Gln Val Ala Gln Leu Glu Leu Gly Gly Gly Pro
        35                  40                  45

Gly Ala Gly Asp Leu Gln Thr Leu Ala Leu Glu Val Ala Arg Gln Lys
    50                  55                  60

Arg Gly Ile Val Asp Gln Cys Cys Thr Ser Ile Cys Ser Leu Tyr Gln
65                  70                  75                  80

Leu Glu Asn Tyr Cys Asn
                85

<210> SEQ ID NO 19
<211> LENGTH: 86
<212> TYPE: PRT
<213> ORGANISM: Mus sp.
```

<400> SEQUENCE: 19

Phe Val Lys Gln His Leu Cys Gly Ser His Leu Val Glu Ala Leu Tyr
1               5                   10                  15

Leu Val Cys Gly Glu Arg Gly Phe Phe Tyr Thr Pro Met Ser Arg Arg
            20                  25                  30

Glu Val Glu Asp Pro Gln Val Ala Gln Leu Glu Leu Gly Gly Gly Pro
        35                  40                  45

Gly Ala Gly Asp Leu Gln Thr Leu Ala Leu Glu Val Ala Gln Gln Lys
    50                  55                  60

Arg Gly Ile Val Asp Gln Cys Cys Thr Ser Ile Cys Ser Leu Tyr Gln
65                  70                  75                  80

Leu Glu Asn Tyr Cys Asn
                85

<210> SEQ ID NO 20
<211> LENGTH: 86
<212> TYPE: PRT
<213> ORGANISM: Felis sp.

<400> SEQUENCE: 20

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Ala Arg Arg
            20                  25                  30

Glu Ala Glu Asp Leu Gln Gly Lys Asp Ala Glu Leu Gly Glu Ala Pro
        35                  40                  45

Gly Ala Gly Gly Leu Gln Pro Ser Ala Leu Glu Ala Pro Leu Gln Lys
    50                  55                  60

Arg Gly Ile Val Glu Gln Cys Cys Ala Ser Val Cys Ser Leu Tyr Gln
65                  70                  75                  80

Leu Glu His Tyr Cys Asn
                85

<210> SEQ ID NO 21
<211> LENGTH: 86
<212> TYPE: PRT
<213> ORGANISM: Rattus sp.

<400> SEQUENCE: 21

Phe Val Lys Gln His Leu Cys Gly Pro His Leu Val Glu Ala Leu Tyr
1               5                   10                  15

Leu Val Cys Gly Glu Arg Gly Phe Phe Tyr Thr Pro Lys Ser Arg Arg
            20                  25                  30

Glu Val Glu Asp Pro Gln Val Pro Gln Leu Glu Leu Gly Gly Gly Pro
        35                  40                  45

Glu Ala Gly Asp Leu Gln Thr Leu Ala Leu Glu Val Ala Arg Gln Lys
    50                  55                  60

Arg Gly Ile Val Asp Gln Cys Cys Thr Ser Ile Cys Ser Leu Tyr Gln
65                  70                  75                  80

Leu Glu Asn Tyr Cys Asn
                85

<210> SEQ ID NO 22
<211> LENGTH: 84
<212> TYPE: PRT
<213> ORGANISM: Mus sp.

```
<400> SEQUENCE: 22

Phe Val Lys Gln His Leu Cys Gly Pro His Leu Val Glu Ala Leu Tyr
1               5                   10                  15

Leu Val Cys Gly Glu Arg Gly Phe Phe Tyr Thr Pro Lys Ser Arg Arg
            20                  25                  30

Glu Val Glu Asp Pro Gln Val Glu Gln Leu Glu Leu Gly Gly Ser Pro
                35                  40                  45

Gly Asp Leu Gln Thr Leu Ala Leu Glu Val Ala Arg Gln Lys Arg Gly
        50                  55                  60

Ile Val Asp Gln Cys Cys Thr Ser Ile Cys Ser Leu Tyr Gln Leu Glu
65                  70                  75                  80

Asn Tyr Cys Asn

<210> SEQ ID NO 23
<211> LENGTH: 81
<212> TYPE: PRT
<213> ORGANISM: Bos sp.

<400> SEQUENCE: 23

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Ala Arg Arg
            20                  25                  30

Glu Val Glu Gly Pro Gln Val Gly Ala Leu Glu Leu Ala Gly Gly Pro
                35                  40                  45

Gly Ala Gly Gly Leu Glu Gly Pro Pro Gln Lys Arg Gly Ile Val Glu
        50                  55                  60

Gln Cys Cys Ala Ser Val Cys Ser Leu Tyr Gln Leu Glu Asn Tyr Cys
65                  70                  75                  80

Asn

<210> SEQ ID NO 24
<211> LENGTH: 81
<212> TYPE: PRT
<213> ORGANISM: Ovis aries

<400> SEQUENCE: 24

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Ala Arg Arg
            20                  25                  30

Glu Val Glu Gly Pro Gln Val Gly Ala Leu Glu Leu Ala Gly Gly Pro
                35                  40                  45

Gly Ala Gly Gly Leu Glu Gly Pro Pro Gln Lys Arg Gly Ile Val Glu
        50                  55                  60

Gln Cys Cys Ala Gly Val Cys Ser Leu Tyr Gln Leu Glu Asn Tyr Cys
65                  70                  75                  80

Asn
```

METHODS AND COMPOSITIONS FOR THE TREATMENT AND PREVENTION OF TYPE 1 DIABETES

CROSS-REFERENCE TO RELATED APPLICATIONS

The present application is a U.S. National Stage of International Application No. PCT/US2020/062159, filed Nov. 25, 2020, which claims priority to U.S. Provisional Application No. 62/944,503, filed Dec. 6, 2019, the contents of which are incorporated herein by reference in their entireties.

SEQUENCE LISTING

The instant application contains a Sequence Listing which has been submitted electronically in ASCII format and is hereby incorporated by reference in its entirety. Said ASCII copy, created on Nov. 23, 2020, is named 120177-0106 PCT Sequence Listing.txt and is 14,714 bytes in size.

BACKGROUND

Type 1 diabetes (T1D; also known as "autoimmune diabetes," and formerly known as "insulin-dependent diabetes," or "juvenile-onset diabetes") is a chronic disease that results from an autoimmune-mediated destruction of pancreatic β-cells with consequent loss of insulin production, which manifests clinically as hyperglycemia, and accounts for 5-10% of all cases of diabetes. The age of symptomatic onset is usually during childhood or adolescence; however, symptoms can develop much later in life. Although the etiology of T1D is not completely understood, the pathogenesis is thought to involve T cell-mediated destruction of pancreatic β-cells. There is no known cure for T1D, and patients must rely on daily insulin therapy to compensate for impaired β-cell function. Insulin treatments typically involve either multiple daily insulin injection therapy or continuous subcutaneous insulin infusion. Without insulin, these patients develop serious complications such as ketoacidosis, retinopathy, nephropathy, vasculopathy, and neuropathy. Because subcutaneous delivery of insulin requires strict, self-regimentation, compliance is often a serious problem. Moreover, the act of parenteral insulin administration can be traumatic for juveniles. Presently, there are no known effective oral or sublingual insulin therapies. Compliance concerns coupled with serious morbidity and an increasing incidence of T1D worldwide, underscore the need to develop effective therapies for T1D prevention and/or treatment.

SUMMARY

The present technology relates generally to compositions and methods for preventing, ameliorating, or treating Type 1 diabetes and/or reducing the severity of one or more risk factors, signs, or symptoms associated with Type 1 diabetes. Additionally, the present technology relates to administering an effective amount of an insulin-related peptide, such as such as Humulin® or a variant thereof having one or more conservative amino acid substitutions, to a subject suffering from or at risk for Type 1 diabetes.

The present technology relates to a sublingual formulation of insulin-related peptide that is capable of significantly reducing the incidence and delaying the onset of T1D in an art-accepted mouse model of the disease (the non-obese diabetic (NOD) mouse). Effective sublingual insulin treatment for T1D is a highly unmet need. The disclosure of the present technology therefore provides a composition formulated for a desirable route of administration that is efficacious in methods for preventing and/or treating one or more signs or symptoms of T1D, including delaying the onset of hyperglycemia, delaying the onset of T1D, and/or decreasing the likelihood of T1D in a subject, and which may improve patient compliance.

One embodiment is directed to a method of delaying the onset of hyperglycemia in a subject in need thereof. The method includes sublingually administering a therapeutically effective amount of an insulin-related peptide to the subject. Examples of suitable insulin-related peptides are peptides which include a first amino acid sequence comprising an insulin beta chain 7-26 peptide sequence (SEQ ID NO: 9) or a variant thereof having one or more amino acid substitutions; and a second amino acid sequence comprising an insulin alpha chain 6-20 peptide sequence (SEQ ID NO: 4) or a variant thereof having one or more amino acid substitutions.

Another embodiment is directed to a method of delaying the onset of Type I diabetes in a subject in need thereof. The method includes sublingually administering a therapeutically effective amount of an insulin-related peptide to the subject. Examples of suitable insulin-related peptides are peptides which include a first amino acid sequence comprising an insulin beta chain 7-26 peptide sequence (SEQ ID NO: 9) or a variant thereof having one or more amino acid substitutions; and a second amino acid sequence comprising an insulin alpha chain 6-20 peptide sequence (SEQ ID NO: 4) or a variant thereof having one or more amino acid substitutions.

Another embodiment is directed to a method of decreasing the likelihood of Type I diabetes in a subject in need thereof. The method includes sublingually administering a therapeutically effective amount of an insulin-related peptide to the subject. Examples of suitable insulin-related peptides are peptides which include a first amino acid sequence comprising an insulin beta chain 7-26 peptide sequence (SEQ ID NO: 9) or a variant thereof having one or more amino acid substitutions; and a second amino acid sequence comprising an insulin alpha chain 6-20 peptide sequence (SEQ ID NO: 4) or a variant thereof having one or more amino acid substitutions.

Another embodiment is directed to a method of attenuating an antigenic response in a mammal to at least one Type 1 diabetes related-antigen. The method includes sublingually administering an effective amount of an insulin-related peptide to the mammal. Examples of suitable insulin-related peptides are peptides which include a first amino acid sequence comprising an insulin beta chain 7-26 peptide sequence (SEQ ID NO: 9) or a variant thereof having one or more amino acid substitutions; and a second amino acid sequence comprising an insulin alpha chain 6-20 peptide sequence (SEQ ID NO: 4) or a variant thereof having one or more amino acid substitutions. After sublingual administration of the insulin-related peptide, the subject may display reduced levels of autoantibodies, such as islet cell antibodies (ICA), glutamic acid decarboxylase-65 (GAD-65) antibodies, insulin autoantibodies (IAA), insulinoma-associated protein 2A (IA-2A) autoantibodies, insulinoma-associated protein 2(3 (IA-2β) autoantibodies, and/or zinc transporter 8 (ZnT8) autoantibodies).

In another embodiment, a composition comprising an insulin-related peptide; and an aqueous pharmaceutically acceptable carrier, which comprises at least about 30 vol.% glycerin, is provided. The composition may be a pharmaceutical composition for attenuating an antigenic response to at least one type 1 diabetes related-antigen. The insulin-related peptide may be a peptide, which includes a first amino acid sequence comprising an insulin beta chain 7-26 peptide sequence (SEQ ID NO: 9) or a variant thereof having one or more amino acid substitutions; and a second amino acid sequence comprising an insulin alpha chain 6-20 peptide sequence (SEQ ID NO: 4) or a variant thereof having one or more amino acid substitutions.

DETAILED DESCRIPTION

I. Definitions

It is to be appreciated that certain aspects, modes, embodiments, variations and features of the present technology are described below in various levels of detail in order to provide a substantial understanding of the present technology. The definitions of certain terms as used in this specification are provided below. Unless defined otherwise, all technical and scientific terms used herein generally have the same meaning as commonly understood by one of ordinary skill in the art to which this present technology belongs.

As used in this specification and the appended claims, the singular forms "a", "an" and "the" include both singular and plural referents unless the content clearly dictates otherwise. For example, reference to "a cell" includes a combination of two or more cells, and the like.

As used herein, the "administration" of an agent, drug, or peptide to a subject refers to sublingual administration of the compositions of the present technology to the subj etc.

As used herein, a "conservative amino acid substitution" is one that does not substantially change the structural and functional characteristics of the parent sequence (e.g., a replacement amino acid should not tend to break a helix that occurs in the parent sequence, or disrupt other types of secondary structure that characterize the parent sequence or are necessary for its functionality).

As used herein, the term "effective amount" refers to a quantity sufficient to achieve a desired therapeutic and/or prophylactic effect, e.g., an amount which results in partial or full amelioration of one or more symptoms of Type 1 diabetes. In the context of therapeutic or prophylactic applications, in some embodiments, the amount of a composition administered to the subject will depend on the type, degree, and severity of the disease and on the characteristics of the individual, such as general health, age, sex, body weight, and tolerance to drugs. The skilled artisan will be able to determine appropriate dosages depending on these and other factors. The compositions can also be administered in combination with one or more additional therapeutic compounds. For example, in the methods described herein, insulin-related peptides of the present technology, such as Humulin® or a variant thereof having one or more conservative amino acid substitutions, may be administered to a subject having one or more signs, symptoms, or risk factors of Type 1 diabetes, including, but not limited to, hyperglycemia, hypoinsulinemia, reduced serum C-peptide levels, elevated A1C levels, presence of T1D-associated autoantibodies, excessive excretion of urine (polyuria), thirst (polydipsia), constant hunger (polyphagia), weight loss, vision changes, fatigue, mental confusion, nausea, vomiting, ketoacidosis, retinopathy, nephropathy, vasculopathy, and neuropathy. The insulin-related peptides may also be administered to a disease-free subjects genetically predisposed to the development of T1D (e.g., first-degree relatives of patients with Type 1 diabetes, where the relatives have been determined to be genetically predisposed to the development of Type 1 diabetes). For example, a "therapeutically effective amount" of the insulin-related peptides includes levels at which the presence, frequency, or severity of one or more signs, symptoms, or risk factors of Type 1 diabetes are, at a minimum, ameliorated. A therapeutically effective amount may reduce or ameliorate the physiological effects of Type 1 diabetes, and/or the risk factors of Type 1 diabetes, and/or the likelihood of developing Type 1 diabetes. A therapeutically effective amount can be given in one or more administrations.

As used herein, the term "insulin-related peptide" refers to a peptide comprising a first amino acid sequence comprising an insulin beta chain (B-chain) or biologically active fragment thereof or a variant of either of these having one or more amino acid substitutions and/or a second amino acid sequence comprising an insulin alpha chain (A-chain) or biologically active fragment thereof or a variant of either of these having one or more amino acid substitutions. In some embodiments, the insulin-related peptide comprises an amino acid sequence comprising an insulin beta chain 7-26 peptide sequence (SEQ ID NO: 9) or a variant thereof having one or more amino acid substitutions. In some embodiments, the insulin-related peptide comprises an amino acid sequence comprising an insulin alpha chain 6-20 peptide sequence (SEQ ID NO: 4) or a variant thereof having one or more amino acid substitutions. In some embodiments, the insulin-related peptide comprises a first amino acid sequence comprising an insulin beta chain 7-26 peptide sequence (SEQ ID NO: 9) or a variant thereof having one or more amino acid substitutions and a second amino acid sequence comprising an insulin alpha chain 6-20 peptide sequence (SEQ ID NO: 4) or a variant thereof having one or more amino acid substitutions. In some embodiments, the insulin-related peptides comprise a first amino acid sequence comprising a human insulin beta chain 7-26 peptide sequence (SEQ ID NO: 9) or a variant thereof having one or more amino acid substitutions and a second amino acid sequence comprising a human insulin alpha chain 6-20 peptide sequence (SEQ ID NO: 4) or a variant thereof having one or more amino acid substitutions. In some embodiments, "insulin-related peptides" include larger fragments of the insulin beta and insulin alpha chains. For example, in some embodiments, the insulin-related peptide may include an insulin beta chain 6-26 peptide sequence (SEQ ID NO: 3), an insulin beta chain 3-26 peptide sequence (SEQ ID NO: 7), an insulin beta chain 4-27 peptide sequence (SEQ ID NO: 8), an insulin beta chain sequence (SEQ ID NO: 1), an insulin alpha chain 1-20 peptide sequence (SEQ ID NO: 5), an insulin alpha chain 4-20 peptide sequence (SEQ ID NO: 6), or an insulin alpha chain sequence (SEQ ID NO: 2), or variants thereof. The insulin-related peptide may be of human origin or of any mammalian species. In some embodiments, the insulin-related peptide is a recombinant human insulin-related peptide, such as Humulin® or a variant thereof having one or more conservative amino acid substitutions. In some embodiments, the insulin-related peptide comprises one or more of insulin, proinsulin, and preproinsulin.

As used herein, the term "Type 1 diabetes" or "T1D," refers to a disorder characterized by insulin deficiency due to pancreatic β-cell loss that leads to hyperglycemia. T1D can be diagnosed using a variety of diagnostic tests as described below. These include, but are not limited to, (1) glycated hemoglobin A1C (HbA1C) test (HbA1C level≥6.5%), (2) oral glucose tolerance test (OGTT; post-load plasma glucose level≥200 mg/dL), (3) random blood glucose test (glucose level≥200 mg/dL at any time of day combined with symptoms of diabetes), (4) fasting plasma glucose (FPG) test (fasting blood sugar≥126 mg/dL), (5) C-peptide level of less than 0.2 nmol/L.

"Treating" or "treatment" as used herein covers the treatment of Type 1 diabetes and/or its signs or symptoms in a subject, such as a human, and includes: (i) inhibiting Type 1 diabetes, i.e., arresting its development; (ii) relieving Type 1 diabetes, i.e., causing regression of the disorder; (iii) slowing the progression of Type 1 diabetes; and/or (iv) inhibiting, relieving, or slowing progression of one or more signs or symptoms of Type 1 diabetes, including, but not limited to, hyperglycemia, hypoinsulinemia, reduced serum C-peptide levels, elevated A1C levels, presence of T1D-associated autoantibodies, polyuria, polydipsia, polyphagia, weight loss, vision changes, fatigue, mental confusion, nausea, vomiting, and ketoacidosis.

As used herein, "preventing" or "prevention" of a disorder or condition refers to a compound that reduces the occurrence or likelihood of the disorder or condition in the treated sample relative to an untreated control sample, or delays the onset of one or more signs or symptoms of the disorder or condition relative to the untreated control sample, including, but not limited to, hyperglycemia, hypoinsulinemia, reduced serum C-peptide levels, elevated A1C levels, presence of T1D-associated autoantibodies, polyuria, polydipsia, polyphagia, weight loss, vision changes, fatigue, mental confusion, nausea, vomiting, and ketoacidosis. As used herein, preventing Type 1 diabetes refers to preventing or delaying the onset of Type 1 diabetes. As used herein, prevention of Type 1 diabetes also includes preventing a recurrence of one or more signs or symptoms of Type 1 diabetes.

It is also to be appreciated that the various modes of treatment or prevention of medical conditions as described herein are intended to mean "substantial," which includes total but also less than total treatment or prevention, and wherein some biologically or medically relevant result is achieved. The treatment may be a continuous prolonged treatment for a chronic disease or a single, or few time administrations for the treatment of an acute condition.

As used herein, the terms "subject" and "patient" are used interchangeably.

II. General

The present technology relates to the surprising discovery of a sublingual formulation of insulin-related peptide that is capable of significantly reducing the incidence and delaying the onset of T1D in an art-accepted mouse model of the disease (the non-obese diabetic (NOD) mouse). Effective sublingual insulin treatment for T1D is a highly unmet need. The methods and compositions of the present technology therefore provide a desirable route of administration that is efficacious as a T1D therapeutic and may improve patient compliance.

III. Insulin-Related Peptides

Insulin hormone is a 51-amino acid protein that is secreted by pancreatic β-cells in the Islets of Langerhans. Insulin is first synthesized as preproinsulin in the rough endoplasmic reticulum of the pancreatic β-cells. After the signal peptide in the preprohormone is removed by proteolytic cleavage, a proinsulin molecule composed of an alpha chain (or A-chain) peptide with 21 amino acids, a beta chain (or B-chain) peptide with 30 amino acids, and an intervening C chain peptide (C-peptide) is produced. Subsequent processing of proinsulin in the Golgi complex produces biologically active insulin by removing the C-peptide and linking the alpha and beta chains through two disulfide bonds at cysteine residues. A third disulfide bond connects two cysteine residues within the alpha chain. Insulin and C-peptide are secreted simultaneously in equimolar amounts in response to various stimuli, such as glucose.

As illustrated by Table 1, the A-chain and B-chain amino acid sequences of insulin are highly conserved among vertebrates. In addition, the positions of the three disulfide bonds are also the same for most species. These highly conserved characteristics lead to a three dimensional conformation of insulin that is very similar across species. For this reason, insulin from one species is often biologically active and has similar physiological effects in other species. Table 1 discloses SEQ ID NOs: 10-24, respectively, in order of appearance.

TABLE 1

Insulin sequences from certain species.

| Vertebrate | | | |
|---|---|---|---|
| HUMAN | FVNQHLCGSHLVEALYLVCGERGFFYTPKT | RR | EAEDLQVGQVELGGGPGAGSLQPLALEGSLQ KR |
| GREAT APES | FVNQHLCGSHLVEALYLVCGERGFFYTPKT | RR | EAEDLQVGQVELGGGPGAGSLQPLALEGSLQ KR |
| MACAQUE (CYNOMOLGUS) | FVNQHLCGSHLVEALYLVCGERGFFYTPKT | RR | EAEDPQVGQVELGGGPGAGSLQPLALEGSLQ KR |
| RABBIT | FVNQHLCGSHLVEALYLVCGERGFFYTPKS | RR | EVEELQVGQAELGGGPGAGGLQPSALELALQ KR |
| CANINE | FVNQHLCGSHLVEALYLVCGERGFFYTPKA | RR | EVEDLQVRDVELAGAPGEGGLQPLALEGALQ KR |
| EQUINE | FVNQHLCGSHLVEALYLVCGERGFFYTPKA | XX | EAEDPQVGEVELGGGPGLGGLQPLALAGPQQ XX |
| PORCINE | FVNQHLCGSHLVEALYLVCGERGFFYTPKA | RR | EAENPQAGAVELGGGLGG--LQALALEGPPQ KR |
| HAMSTER | FVNQHLCGSHLVEALYLVCGERGFFYTPKS | RR | GVEDPQVAQLELGGGPGADDLQTLALEVAQQ KR |
| RAT II | FVKQHLCGSHLVEALYLVCGERGFFYTPMS | RR | EVEDPQVAQLELGGGPGAGDLQTLALEVARQ KR |
| MOUSE II | FVKQHLCGSHLVEALYLVCGERGFFYTPMS | RR | EVEDPQVAQLELGGGPGAGDLQTLALEVAQQ KR |
| FELINE | FVNQHLCGSHLVEALYLVCGERGFFYTPKA | RR | EAEDLQGKDAELGEAPGAGGLQPSALEAPLQ KR |
| RAT I | FVKQHLCGPHLVEALYLVCGERGFFYTPKS | RR | EVEDPQVPQLELGGGPEAGDLQTLALEVARQ KR |
| MOUSE I | FVKQHLCGPHLVEALYLVCGERGFFYTPKS | RR | EVEDPQVEQLELGGSP--GDLQTLALEVARQ KR |
| BOVINE | FVNQHLCGSHLVEALYLVCGERGFFYTPKA | RR | EVEGPQVGALELAGGPG-----AGGLEGPPQ KR |
| OVINE | FVNQHLCGSHLVEALYLVCGERGFFYTPKA | RR | EVEGPQVGALELAGGPG-----AGGLEGPPQ KR |
| | Insulin B-chain | | C-peptide |

TABLE 1-continued

Insulin sequences from certain species.

| Vertebrate | | SEQ ID NO: |
|---|---|---|
| HUMAN | GIVEQCCTSICSLYQLENYCN | 10 |
| GREAT APES | GIVEQCCTSICSLYQLENYCN | 11 |
| MACAQUE (CYNOMOLGUS) | GIVEQCCTSICSLYQLENYCN | 12 |
| RABBIT | GIVEQCCTSICSLYQLENYCN | 13 |
| CANINE | GIVEQCCTSICSLYQLENYCN | 14 |
| EQUINE | GIVEQCCTGICSLYQLENYCN | 15 |
| PORCINE | GIVEQCCTSICSLYQLENYCN | 16 |
| HAMSTER | GIVDQCCTSICSLYQLENYCN | 17 |
| RAT II | GIVDQCCTSICSLYQLENYCN | 18 |
| MOUSE II | GIVDQCCTSICSLYQLENYCN | 19 |
| FELINE | GIVEQCCASVCSLYQLEHYCN | 20 |
| RAT I | GIVDQCCTSICSLYQLENYCN | 21 |
| MOUSE I | GIVDQCCTSICSLYQLENYCN | 22 |
| BOVINE | GIVEQCCASVCSLYQLENYCN | 23 |
| OVINE | GIVEQCCAGVCSLYQLENYCN | 24 |
| | Insulin A-chain | |

The insulin-related peptides of the present technology, which are formulated for sublingual administration, include a peptide comprising an amino acid sequence comprising an insulin beta chain (B-chain) or a biologically active fragment thereof or a variant of either of these having one or more amino acid substitutions, and may include any one or more of the B-chain sequences as shown in Table 1. In some embodiments, the insulin-related peptides of the present technology, which are formulated for sublingual administration, include a peptide comprising an amino acid sequence comprising an insulin alpha chain (A-chain) or a biologically active fragment thereof or a variant of either of these having one or more amino acid substitutions, and may include any one or more of the A-chain sequences as shown in Table 1. In some embodiments, the insulin-related peptides of the present technology, which are formulated for sublingual administration, include a peptide comprising a first amino acid sequence comprising an insulin beta chain (B-chain) or a biologically active fragment thereof or a variant of either of these having one or more amino acid substitutions and a second amino acid sequence comprising an insulin alpha chain (A-chain) or a biologically active fragment thereof or a variant of either of these having one or more amino acid substitutions, and may include any one or more of the B-chain and A-chain sequences as shown in Table 1. In some embodiments, the insulin-related peptides of the present technology include an insulin beta chain 7-26 peptide sequence (SEQ ID NO: 9) or a variant thereof having one or more amino acid substitutions and a second amino acid sequence comprising an insulin alpha chain 6-20 peptide sequence (SEQ ID NO: 4) or a variant thereof having one or more amino acid substitutions. In some embodiments, the insulin-related peptides of the present technology include larger fragments of the insulin beta and insulin alpha chains. For example, in some embodiments, the insulin-related peptide may include an insulin beta chain 6-26 peptide sequence (SEQ ID NO: 3), an insulin beta chain 3-26 peptide sequence (SEQ ID NO: 7), an insulin beta chain 4-27 peptide sequence (SEQ ID NO: 8), an insulin beta chain sequence (SEQ ID NO: 1), an insulin alpha chain 1-20 peptide sequence (SEQ ID NO: 5), an insulin alpha chain 4-20 peptide sequence (SEQ ID NO: 6), or an insulin alpha chain sequence (SEQ ID NO: 2). The insulin-related peptide may be of human origin or of any mammalian species. For example, the insulin-related peptides of the present technology may include any one or more of the insulin A-chains or B-chains shown in Table 1. In some embodiments, the insulin-related peptide is a recombinant human insulin-related peptide, such as Humulin® or a variant thereof having one or more conservative amino acid substitutions. In some embodiments, the insulin-related peptide comprises one or more of insulin, proinsulin, and preproinsulin. In some embodiments, the insulin-related peptide is a fast-acting, intermediate-acting, or long-acting insulin analog.

In addition to the insulin-related peptide sequences provided in Table 1, exemplary, non-limiting insulin-related peptides of the present technology are also provided in Table 2.

TABLE 2

Exemplary insulin-related peptides.

| Insulin-related peptide alpha chain peptides and fragments | |
|---|---|
| GlyIleValGluGlnCysCysThrSerIleCysSer LeuTyrGlnLeuGluAsnTyrCysAsn | SEQ ID NO: 2 |
| CysCysThrSerIleCysSerLeuTyrGlnLeuGlu AsnTyrCys | SEQ ID NO: 4 |
| GlyIleValGluGlnCysCysThrSerIleCysSer LeuTyrGlnLeuGluAsnTyrCys | SEQ ID NO: 5 |
| GluGlnCysCysThrSerIleCysSerLeuTyrGln LeuGluAsnTyrCys | SEQ ID NO: 6 |

| Insulin-related peptide beta chain peptides and fragments | |
|---|---|
| PheValAsnGlnHisLeuCysGlySerHisLeuVal GluAlaLeuTyrLeuValCysGlyGluArgGlyPhe PheTyrThrProLysThr | SEQ ID NO: 1 |
| LeuCysGlySerHisLeuValGluAlaLeuTyrLeu ValCysGlyGluArgGlyPhePheTyr | SEQ ID NO: 3 |
| AsnGlnHisLeuCysGlySerHisLeuValGluAla LeuTyrLeuValCysGlyGluArgGlyPhePheTyr | SEQ ID NO: 7 |
| GlnHisLeuCysGlySerHisLeuValGluAlaLeu TyrLeuValCysGlyGluArgGlyPhePheTyrThr | SEQ ID NO: 8 |
| CysGlySerHisLeuValGluAlaLeuTyrLeuVal CysGlyGluArgGlyPhePheTyr | SEQ ID NO: 9 |

Suitable substitution variants of the peptides listed herein include conservative amino acid substitutions. Amino acids may be grouped according to their physicochemical characteristics as follows:

(a) Non-polar amino acids: Ala(A) Ser(S) Thr(T) Pro(P) Gly(G) Cys (C);

(b) Acidic amino acids: Asn(N) Asp(D) Glu(E) Gln(Q);
(c) Basic amino acids: His(H) Arg(R) Lys(K);
(d) Hydrophobic amino acids: Met(M) Leu(L) Ile(I) Val (V); and
(e) Aromatic amino acids: Phe(F) Tyr(Y) Trp(W).

Substitutions of an amino acid in a peptide by another amino acid in the same group are referred to as a conservative substitution and may preserve the physicochemical characteristics of the original peptide. In other embodiments, variants of the peptides described herein may include one or more of the following substitutions:

Asn substituted by Lys, His, or Gly
Glu substituted by Asp
Ile substituted by Ala, Gly, Leu, or Val
Lys substituted by Met
Ser substituted by Thr, Gly, Ala, or Pro
Thr substituted by Ala, Ser, Gly, or Val.

The peptides may be synthesized by any of the methods well known in the art. Suitable methods for chemically synthesizing the protein include, for example, those described by Stuart and Young in *Solid Phase Peptide Synthesis*, Second Edition, Pierce Chemical Company (1984), and in *Methods Enzymol.*, 289, Academic Press, Inc., New York (1997).

IV. Type 1 Diabetes

Type 1 diabetes (T1D), also known as "autoimmune diabetes," (previously known as "insulin-dependent diabetes," or "juvenile-onset diabetes") is a chronic disease characterized by insulin deficiency due to pancreatic β-cell loss that leads to hyperglycemia. The age of symptomatic onset is usually during childhood or adolescence; however, symptoms can sometimes develop much later. Although the etiology of T1D is not completely understood, the pathogenesis of the disease is thought to involve T cell-mediated destruction of β-cells. A cure is not available, and patients depend on lifelong insulin injections. Although intensive glycemic control has reduced the incidence of microvascular and macrovascular complications, the majority of patients with T1D are still developing these complications.

A. Clinical Manifestations

The clinical signs and symptoms of T1D include hyperglycemia, hypoinsulinemia, reduced serum C-peptide levels, elevated A1C levels, presence of T1D-associated autoantibodies, excessive excretion of urine (polyuria), thirst (polydipsia), constant hunger (polyphagia), weight loss, vision changes, fatigue, mental confusion, nausea, vomiting, and ketoacidosis. Chronic symptoms of T1D include retinopathy, nephropathy, vasculopathy, and neuropathy.

B. Diagnosis

T1D in humans is diagnosed by a combination of symptoms and the results of certain blood tests. In a fasting plasma glucose (FPG) test, diabetes is diagnosed if a fasting blood sugar level is 126 mg/dL or higher. In an oral glucose tolerance test (OGTT), diabetes is diagnosed if the 2-hour post-load plasma glucose level is 200 mg/dL or higher. In a random blood glucose test, a blood glucose level of 200 mg/dL or greater at any time of day combined with symptoms of diabetes is sufficient to make the diagnosis. In a hemoglobin A1C (HbA1C; glycohemoglobin) test, which measures the average glucose level over the prior two to three months, diabetes is diagnosed if the HbA1C level is 6.5% or higher. If elevated values are detected in asymptomatic people, repeat testing, preferably with the same test, is recommended as soon as practicable on a subsequent day to confirm the diagnosis. Endogenous insulin production can be assessed by measuring serum C-peptide either in the fasting state or after a stimulus, most commonly intravenously administered glucagon. C-peptide can also be measured in urine. The normal range for fasting serum C-peptide levels in humans is 0.26 to 1.27 nmol/L. A C-peptide level of less than 0.2 nmol/L is associated with a diagnosis of T1D in humans.

Progression to T1D is typically preceded by a prodrome of anti-islet autoantibody expression. Biomarkers of T1D-associated autoimmunity that may be found months to years before symptom onset include a number of T1D-associated autoantibodies such as insulin autoantibodies (IAA), islet cell antibodies (ICA), 65 kDa glutamic acid decarboxylase (GAD-65), insulinoma-associated protein 2A or 2β (IA-2A, IA-2(3), and zinc transporter 8 (ZnT8), which are proteins associated with secretory granules in β-cells. In predisposed, but disease-free individuals, detection of multiple islet cell autoantibodies is a strong predictor for subsequent development of T1D.

C. Prognostic Indicators

Methods for assessing the signs, symptoms, or complications of T1D are known in the art. Once the diagnosis of diabetes is made, an important goal of therapy is to maintain the average glucose as near the normal range as possible without causing unacceptable amounts of hypoglycemia. The goal for most patients with T1D is to maintain an HbA1c level<7.0% (estimated average glucose of<154 mg/dL). In addition to the HbA1c test, other exemplary methods for assaying the signs, symptoms, or complications of T1D include, but are not limited to, the fasting plasma glucose (FPG) test, the oral glucose tolerance test (OGTT), the random blood glucose test, the C-peptide test, and tests to monitor the levels of T1D-associated autoantibodies.

D. Prophylactic and Therapeutic Methods

The following discussion is presented by way of example only, and is not intended to be limiting.

One aspect of the present technology provides a method for preventing or delaying the onset of T1D or symptoms of T1D in a subject predisposed to the development of or at risk of having T1D (e.g., first-degree relatives of patients with T1D, where the relatives have been determined to be genetically predisposed to the development of T1D).

Subjects at risk for T1D can be identified by, e.g., any one or a combination of diagnostic or prognostic assays known in the art. In prophylactic applications, insulin-related peptides of the present technology are administered to a subject susceptible to, or otherwise at risk of T1D in an amount sufficient to eliminate or reduce the risk, or delay the onset of the disease, including biochemical and/or behavioral symptoms of the disease, its complications and intermediate pathological phenotypes presenting during development of the disease. Administration of a prophylactic insulin-related peptide can occur prior to the manifestation of symptoms characteristic of the disease, such that the disease is prevented, or alternatively, delayed in its progression.

Subjects at risk for T1D or hyperglycemia include, but are not limited to, subjects who are related to a diabetic individual (usually a first-degree relative) or identified to have high-risk HLA genotypes (e.g., the DR3/4-DQ2/8 genotype). Screening for serologic markers including insulin autoantibodies (IAA) and serum autoantibodies associated with islet beta cells (ICA): IA-2A, IA-2β, IAA, GAD-65, and ZnT8 can also identify individuals at high risk for developing T1D. Assessing C-peptide levels is a widely-used measure of pancreatic β cell function and can also be used to assess an individual's risk for the development of T1D.

Another aspect of the present technology includes methods of treating T1D in a subject diagnosed as having, suspected of having, or at risk of having T1D. In therapeutic applications, compositions comprising insulin-related peptides of the present technology are administered to a subject suspected of, or already suffering from the disease (such as, e.g., subjects exhibiting hyperglycemia, elevated serum autoantibodies associated with T1D, reduced C-peptide levels) in an amount sufficient to cure, or at least partially arrest, the symptoms of the disease, including its complications.

In certain embodiments, T1D subjects treated with the sublingual formulations of the insulin-related peptides of the present technology will show normalization of blood glucose levels, T1D-associated autoantibodies, and/or C-peptide levels by at least 5%, at least 10%, at least 50%, at least 75%, or at least 90% compared to untreated T1D subjects. In certain embodiments, T1D subjects treated with the sublingual formulations of the insulin-related peptides of the present technology will show blood glucose levels, T1D-associated autoantibodies, and/or C-peptide levels that are similar to that observed in a normal control subject.

E. Modes of Administration, Pharmaceutical Compositions, and Effective Dosages

In vivo methods typically include the administration of an agent such as those described herein, to a mammal such as a human. When used in vivo for therapy, an agent of the present technology is administered to a mammal in an amount effective in obtaining the desired result or treating the mammal. The dose and dosage regimen will depend upon the degree of the disease in the subject, the characteristics of the particular insulin-related peptide used (e.g., its therapeutic index, duration of action, etc.), the subject, and the subject's history.

An effective amount of an insulin-related peptide of the present technology may be determined during pre-clinical trials and clinical trials by methods familiar to physicians and clinicians. An effective amount of an insulin-related peptide useful in the methods may be administered to a mammal in need thereof by any number of well-known methods for administering pharmaceutical compounds. In particular embodiments, the insulin-related peptides of the present technology are formulated for sublingual administration.

The insulin-related peptides described herein can be incorporated into pharmaceutical compositions for administration, singly or in combination, to a subject for the treatment or prevention of T1D. Such compositions may include the insulin-related peptide and a pharmaceutically acceptable carrier. As used herein, the term "pharmaceutically acceptable carrier" includes a buffer, glycerin, saline, solvents, dispersion media, coatings, antibacterial and antifungal agents, isotonic and absorption delaying agents, and the like, compatible with pharmaceutical administration. Supplementary active compounds can also be incorporated into the compositions.

For the convenience of the patient or treating physician, the dosing formulations can be provided in a kit containing all necessary equipment (e.g., vials of drug, vials of diluent, etc.) for a treatment course.

Sublingual compositions generally include an inert diluent or an edible carrier. For the purpose of sublingual therapeutic administration, the insulin-related peptide can be incorporated with an aqueous pharmaceutically acceptable carrier or excipient (e.g., glycerin) and used in the form of tablets, troches, or capsules. In some embodiments, the aqueous pharmaceutically acceptable carrier comprises at least about 30 vol. % glycerin, at least about 31 vol. % glycerin, at least about 32 vol. % glycerin, at least about 33 vol. % glycerin, at least about 34 vol. % glycerin, at least about 35 vol. % glycerin, at least about 36 vol. % glycerin, at least about 37 vol. % glycerin, at least about 38 vol. % glycerin, at least about 39 vol. % glycerin, at least about 40 vol. % glycerin, at least about 41 vol. % glycerin, at least about 42 vol. % glycerin, at least about 43 vol. % glycerin, at least about 44 vol. % glycerin, at least about 45 vol. % glycerin, at least about 46 vol. % glycerin, at least about 47 vol. % glycerin, at least about 48 vol. % glycerin, at least about 49 vol. % glycerin, at least about 50 vol. % glycerin, at least about 51 vol. % glycerin, at least about 52 vol. % glycerin, at least about 53 vol. % glycerin, at least about 54 vol. % glycerin, at least about 55 vol. % glycerin, or at least about 60 vol. % glycerin. In some embodiments, the aqueous pharmaceutically acceptable carrier comprises at least about 30-70 vol. % glycerin, at least about 35-65 vol. % glycerin, at least about 40-60 vol. % glycerin, at least about 45-60 vol. % glycerin, at least about 50-60 vol. % glycerin, or at least about 50-55 vol. % glycerin. In some embodiments, the aqueous pharmaceutically acceptable carrier further comprise a buffer. The pH can be adjusted with acids or bases, such as hydrochloric acid or sodium hydroxide. Pharmaceutically compatible binding agents and/or adjuvant materials can be included as part of the composition.

Dosage, toxicity, and therapeutic efficacy can be determined by standard pharmaceutical procedures in cell cultures or experimental animals, e.g., for determining the LD50 (the dose lethal to 50% of the population). The dose ratio between toxic and therapeutic effects is the therapeutic index and it can be expressed as the ratio LD50/ED50. Compounds that exhibit high therapeutic indices are advantageous.

The data obtained from the cell culture assays and animal studies can be used in formulating a range of dosage for use in humans. The dosage of such compounds may be within a range of circulating concentrations that include the ED50 with little or no toxicity. The dosage may vary within this range depending upon the dosage form employed and the route of administration utilized. For any compound used in the methods of the present technology, the therapeutically effective dose can be estimated initially from cell culture assays and/or animal studies. Such information can be used to determine useful doses in humans accurately. Levels in plasma may be measured, for example, by high performance liquid chromatography. The dose and dosage regimen will depend upon the degree of the disease in the subject, the characteristics of the particular insulin-related peptide used (e.g., its therapeutic index, duration of action, etc.), the subject, and the subject's history.

Typically, an effective amount of the insulin-related peptides, sufficient for achieving a therapeutic or prophylactic effect, ranges from about 0.000001 mg per kilogram body weight per day to about 10,000 mg per kilogram body weight per day. Suitable, the dosage ranges are from about 0.0001 mg per kilogram body weight per day to about 100 mg per kilogram body weight per day. For example, dosages can be 1 mg/kg body weight or 10 mg/kg body weight every day, every two days or every three days or within the range of 1-10 mg/kg every week, every two weeks or every three weeks. In one embodiment, a single dosage of peptides ranges from 0.001-10,000 micrograms per kilogram body weight. In one embodiment, insulin-related peptide concentrations in a carrier range from 0.2 to 2000 micrograms per delivered milliliter. In some embodiments, an effective amount of insulin-related peptides sufficient for achieving a therapeutic or prophylactic effect, is measured in units of insulin. For example, dosages can range from 0.5 to 1 unit of insulin/kg body weight/day. An exemplary treatment regimen entails sublingual administration of the insulin-related peptide once a day, at least five days a week, for at least 7 weeks. In some embodiments, treatment entails sublingual administration at least once daily for at least 7 weeks. In therapeutic applications, a relatively high dosage at relatively short intervals is sometimes required until progression of the disease is reduced or terminated, or until the subject shows partial or complete amelioration of symptoms of disease. Thereafter, the patient can be administered a prophylactic regimen.

The skilled artisan will appreciate that certain factors may influence the dosage and timing required to effectively treat a subject, including but not limited to, the severity of the disease, previous treatments, the general health and/or age of the subject, and other diseases present.

EXAMPLES

The present technology is further illustrated by the following examples, which should not be construed as limiting in any way.

Materials and Methods

Sublingual formulation. A commercial high dose Humulin® solution (Humulin® R U-500) containing 500 units of insulin per mL is mixed with an additional equal volume (1:1 (vol:vol)) 100% glycerin. Each dose contains 10 µL of the Humulin®-glycerin solution, which contains 2.5 units (approximately 87 micrograms) of insulin in a solution having a final concentration of 52 vol. % glycerin.

NOD mice. Non-obese diabetic (NOD) mice, as described by Makino (Adv. Immunol. 51:285-322 (1992)), are used in the studies described herein. NOD mice provide an animal model for the spontaneous development of Type 1 diabetes. NOD mice develop insulitis as a result of leukocyte infiltration into the pancreatic islet, which in turn leads to the destruction of pancreatic islets and a Type 1 diabetic phenotype.

Serum C-peptide assay. The mouse C-peptide ELISA (ALPCO), which quantifies C-peptide protein products of mouse I and mouse II proinsulin genes, is used. Briefly, serum is collected by inserting a needle into the submandibular vein and collecting ~0.2 mL of blood. The blood is centrifuged for 30 minutes at 17,000 rpm in a refrigerated centrifuge, and serum is collected and stored −80° C.

Autoantibody titer assay. Commercially available ELISA assays are employed for detecting the presence of anti-insulin antibodies in serum samples collected from subjects.

Example 1: Use of Insulin-Related Peptides in Delaying the Onset of Hyperglycemia in a Mouse Model of Type 1 Diabetes This Example demonstrates the use of a sublingual formulation of insulin-related peptides of the present technology in methods for delaying the onset of hyperglycemia in a mouse model of Type 1 diabetes.

Methods

Five-week old female NOD mice were randomly assigned to three groups: (1) control group (1:1 glycerin/phosphate buffered saline (PBS)); (2) insulin-related peptide treatment (Humulin®) started at six weeks of age; or (3) insulin-related peptide treatment (Humulin®) started at ten weeks of age. Mice in the treatment groups (2) and (3) were sublingually administered 87 µg of Humulin® (10 µL of solution) once per day up to 30 weeks of age. Blood glucose measurements were taken once per week up to 20 weeks of age, and then twice per week thereafter. Mice were classified as diabetic after three consecutive blood glucose readings above 300 mg/dL (hyperglycemic).

Results

Figure 1A:
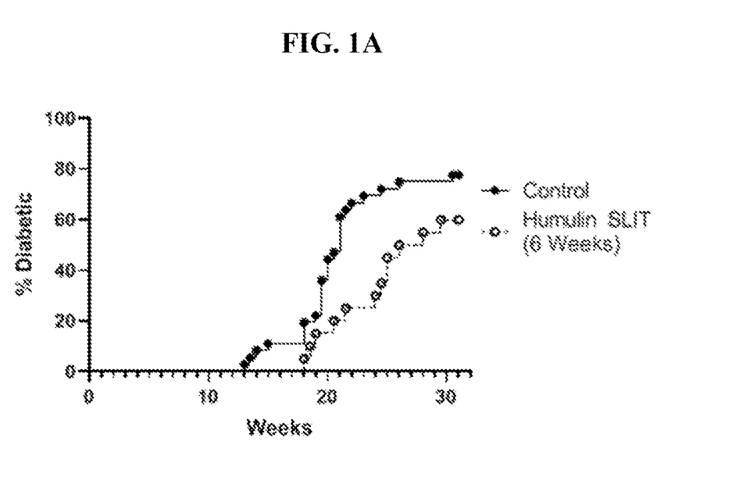
FIGS. 1A and 1B are charts showing the incidence and time to onset of Type 1 diabetes in control NOD mice and in NOD mice treated with Humulin® beginning at 6 weeks of age (FIG. 1A) and at 10 weeks of age (FIG. 1B).
Figure 1B:
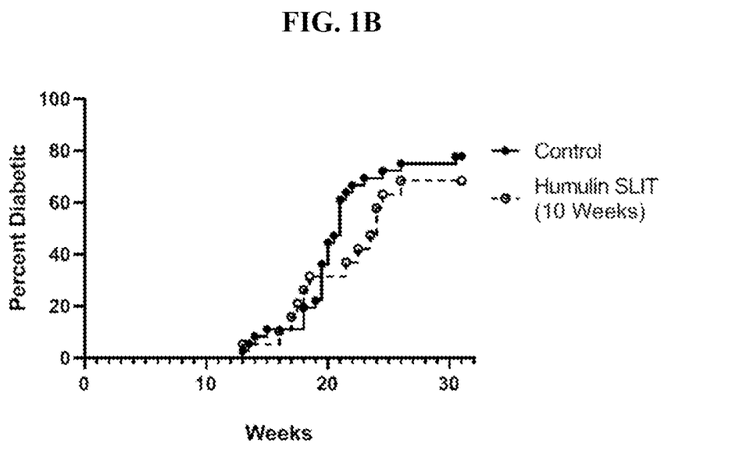

As shown in FIG. 1A, treatment with sublingual Humulin® significantly reduced both the incidence (% T1D Onset) of Type 1 diabetes and onset time (weeks) of Type 1 diabetes in treatment group 2 (i.e., mice treated with Humulin® starting at six (6) weeks of age) as compared to the control group. FIG. 1B, shows the results from treatment group 3 (i.e., mice treated with Humulin® starting at ten (10) weeks of age) as compared to the control group. Table 3 provides the statistics associated with the survival curves shown in FIGS. 1A and 1B.

TABLE 3

Comparison of Survival Curves

|  | FIG. 1A | FIG. 1B |
| --- | --- | --- |
| Log-rank (Mantel-Cox) test | | |
| Chi square | 3.98 | 0.812 |
| Df | 1 | 1 |
| P value | 0.0460 | 0.367 |
| P value summary | * | ns |
| Are the survival curves significantly different? | Yes | No |
| Gehan-Breslow-Wilcoxon test | | |
| Chi square | 5.45 | 0.725 |
| Df | 1 | 1 |
| P value | 0.020 | 0.389 |
| P value summary | * | ns |
| Are the survival curves significantly different? | Yes | No |
| Median Survivaltime to Type 1 diabetes onset) | | |
| Control | 21 weeks | 21 weeks |
| 6/10 wk Humulin initiation | 27 weeks | 24 weeks |
| Ratio (and its reciprocal) | 0.778 (1.29) | 0.8750 (1.14) |
| 95% CI of ratio | 0.396 to 1.53 (0.654 to 2.53) | 0.453 to 1.69 (0.592 to 2.21) |

These results demonstrate that the sublingual formulations of insulin-related peptides of the present technology, such as Humulin®, are useful in methods for treating Type 1 diabetes, where treatment includes delaying the onset of hyperglycemia or decreasing the likelihood of developing Type 1 diabetes in a subject in need thereof.

Example 2: Use of Insulin-Related Peptides in Maintaining Serum C-Peptide Levels This Example demonstrates the use of a sublingual formulation of insulin-related peptides of the present technology in methods for maintaining serum C-peptide levels in a mouse model of Type 1 diabetes. C-peptide is the portion of proinsulin joining the alpha and beta insulin chains that is cleaved out prior to co-secretion with insulin from pancreatic beta cells. Produced in equimolar amounts to endogenous insulin, the 31-amino acid C-peptide is not a product of therapeutically administered exogenous insulin and has been widely used as a measure of insulin secretion (or pancreatic beta cell function).

Methods

Five-week old female NOD mice are randomly assigned to three groups as described in Example 1: (1) control group (oil only); (2) insulin-related peptide treatment (Humulin®) started at six weeks of age; or (3) insulin-related peptide treatment (Humulin®) started at ten weeks of age. Mice in the treatment groups (2) and (3) are sublingually administered 87 μg of Humulin® once per day up to 30 weeks of age. Baseline C-peptide measurements are taken from serum drawn at week 6. Thereafter, C-peptide measurements are taken from serum drawn 1 time per 2 weeks beginning at week 20 up to 30 weeks of age.
Results It is predicted that NOD mice receiving insulin-related peptide treatment, such as Humulin® or a variant thereof having one or more conservative amino acid substitutions, will display maintenance or enhanced serum C-peptide levels as compared to untreated control NOD mice which develop clinical symptoms of Type 1 diabetes. These results will show that sublingual formulations of insulin-related peptides of the present technology are useful in the treatment of Type 1 diabetes in a subject, particularly those with biological markers or history indicating a predisposition to the development of Type 1 diabetes.

Example 3: Use of Insulin-Related Peptides in Attenuating an Antigenic Response

This Example demonstrates the use of a sublingual formulation of insulin-related peptides of the present technology in methods for attenuating an antigenic response in subjects at risk for or having been diagnosed with Type 1 diabetes. The onset of Type 1 diabetes is preceded and accompanied by the appearance of a number of autoantibodies to a variety of pancreatic islet cell antigens. In genetically predisposed, but disease-free, individuals (e.g., first-degree relatives of patients with Type 1 diabetes), detection of multiple islet cell autoantibodies is a strong predictor for subsequent development of Type I diabetes. These autoantibodies include, but are not limited to, islet cell antibodies (ICA, against cytoplasmic proteins in the beta cell), antibodies to glutamic acid decarboxylase (GAD-65), insulin autoantibodies (IAA), and autoantibodies to tyrosine phosphatases IA-2A and IA-2β, and ZnT8.
Methods Five-week old female NOD mice are randomly assigned to three groups as described in Example 1: (1) control group (oil only); (2) insulin-related peptide treatment (Humulin®) started at six weeks of age; or (3) insulin-related peptide treatment (Humulin®) started at ten weeks of age. Mice in the treatment groups (2) and (3) are sublingually administered 87 μg of humulin once per day up to 30 weeks of age. The subjects are assessed for baseline levels of autoantibodies at week 6. Thereafter, autoantibody titer measurements are taken once every other week beginning at week 15 up to 30 weeks of age.
Results It is predicted that NOD mice receiving insulin-related peptide treatment, such as Humulin® or a variant thereof having one or more conservative amino acid substitutions, will display an attenuated antigenic response (e.g., of islet cell autoantibody levels) as compared to untreated controls. These results will demonstrate that sublingual formulations of insulin-related peptides of the present technology, such as Humulin® or a variant thereof having one or more conservative amino acid substitutions, are useful in the treatment of Type 1 diabetes in a subject in need thereof.

Example 4: Use of Insulin-Related Peptides in Delaying the Onset of Hyperglycemia in Humans This Example demonstrates the use of a sublingual formulation of insulin-related peptides of the present technology in methods for treating Type 1 diabetes in disease-free, individuals predisposed to the development of Type 1 diabetes (e.g., first-degree relatives of patients with Type 1 diabetes, where the relatives have been determined to be genetically predisposed to the development of Type 1 diabetes).
Methods Subjects determined to be predisposed to the development of Type 1 diabetes receive daily, sublingual administrations of an insulin-related peptide of the present technology. Dosages will range between 0.1 mg/kg to 50 mg/kg. Subjects will be evaluated weekly for the presence and/or severity of signs and symptoms associated with Type 1 diabetes, including, but not limited to, e.g., hyperglycemia, hypoinsulinemia, serum C-peptide levels, A1C levels, or presence of autoantibodies. Treatments may be maintained indefinitely or until such time as one or more signs or symptoms of Type 1 diabetes develop.
Results It is predicted that subjects predisposed to the development of Type 1 diabetes receiving sublingually administered therapeutically effective amounts of insulin-related peptides of the present technology will display delayed and/or reduced severity or elimination of the signs or symptoms associated with the development of Type 1 diabetes. These results will show that sublingual formulations of insulin-related peptides of the present technology, such as Humulin® or a biologically active fragment thereof or a variant of either of these having one or more conservative amino acid substitutions, are useful in the treatment of Type 1 diabetes in a subject in need thereof and in particular, in delaying the onset of hyperglycemia and/or decreasing the likelihood of developing Type 1 diabetes in the subject.

EQUIVALENTS

The present technology is not to be limited in terms of the particular embodiments described in this application, which are intended as single illustrations of individual aspects of the present technology. Many modifications and variations of this present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the appended claims. The present technology is to be limited only by the terms of the appended claims, along with the full scope of equivalents to which such claims are entitled. It is to be understood that this present technology is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The foregoing description is provided to assist the understanding of the reader. None of the information provided or references cited is admitted to be prior art to the compositions and methods disclosed herein.

All patents, patent applications, provisional applications, and publications referred to or cited herein are incorporated by reference in their entirety, including all figures and tables, to the extent they are not inconsistent with the explicit teachings of this specification.

Other embodiments are set forth within the following claims.

What is claimed is:

1. A method of delaying the onset of Type 1 diabetes or decreasing the likelihood of Type 1 diabetes in a subject in need thereof comprising:

sublingually administering a therapeutically effective amount of an insulin-related peptide to the subject.

2. The method of claim 1, wherein the insulin-related peptide is administered once a day, at least five days a week, for at least 7 weeks.

3. The method of claim 1, wherein the insulin-related peptide is administered at least once daily for at least 7 weeks.

4. The method of claim 1, wherein the insulin-related peptide comprises a first amino acid sequence comprising an insulin beta chain 7-26 peptide sequence (SEQ ID NO: 9) or a variant thereof having one or more amino acid substitutions; and a second amino acid sequence comprising an insulin alpha chain 6-20 peptide sequence (SEQ ID NO: 4) or a variant thereof having one or more amino acid substitutions.

5. The method of claim 4, wherein the first amino acid sequence corresponds to an insulin beta chain amino acid sequence; and/or the second amino acid sequence corresponds to an insulin alpha chain amino acid sequence.

6. The method of claim 1, wherein:
  (a) the insulin-related peptide comprises one or more of insulin, proinsulin and preproinsulin; or
  (b) the insulin-related peptide comprises human insulin; or
  (c) the insulin-related peptide comprises human proinsulin and/or human preproinsulin.

7. The method of claim 4, wherein:
  (a) the first amino acid sequence comprises a human insulin beta chain 6-26 peptide sequence (SEQ ID NO: 3); or
  (b) the first amino acid sequence corresponds to a human insulin beta chain amino acid sequence (SEQ ID NO: 1); or
  (c) the second amino acid sequence comprises a human insulin alpha chain 6-20 peptide sequence (SEQ ID NO: 4); or
  (d) the second amino acid sequence corresponds to a human insulin alpha chain amino acid sequence (SEQ ID NO: 2); or
  (e) the second amino acid sequence comprises a variant of a human insulin alpha chain 6-20 peptide sequence (SEQ ID NO: 4), which comprises an alpha chain 8-Thr substituted by Ser, Val, Ala, or Gly; or
  (f) the second amino acid sequence corresponds to a variant of a human insulin alpha chain amino acid sequence (SEQ ID NO: 2), which comprises an alpha chain 8-Thr substituted by Ser, Val, Ala, or Gly; or
  (g) the second amino acid sequence comprises a variant of a human insulin alpha chain 6-20 peptide sequence (SEQ ID NO: 4), which comprises an alpha chain 9-Ser substituted by Thr, Ala, or Gly; or
  (h) the second amino acid sequence corresponds to a variant of a human insulin alpha chain amino acid sequence (SEQ ID NO: 2), which comprises an alpha chain 9-Ser substituted by Thr, Ala, or Gly; or
  (i) the second amino acid sequence comprises a variant of a human insulin alpha chain 6-20 peptide sequence (SEQ ID NO: 4), which comprises an alpha chain 10-Ile substituted by Val, Ala or Gly; or
  (j) the second amino acid sequence corresponds to a variant of a human insulin alpha chain amino acid sequence (SEQ ID NO: 2), which comprises an alpha chain 10-Ile substituted by Val, Ala or Gly; or
  (k) the second amino acid sequence corresponds to a variant of a human insulin alpha chain amino acid sequence (SEQ ID NO: 2), which comprises an alpha chain 21-Asn substituted by Ala or Gly; or
  (l) the second amino acid sequence comprises a variant of a human insulin alpha chain 6-20 peptide sequence (SEQ ID NO: 4), wherein the variant comprises one or more amino acid substitutions selected from:
    an alpha chain 8-Thr substituted by Ser, Val, Ala, or Gly;
    an alpha chain 9-Ser substituted by Thr, Ala, or Gly; and
    an alpha chain 10-Ile substituted by Leu, Val, Ala or Gly; or
  (m) the second amino acid sequence corresponds to a variant of a human insulin alpha chain 1-20 peptide sequence (SEQ ID NO: 5); or
  (n) the first amino acid sequence corresponds to a human insulin beta chain amino acid sequence (SEQ ID NO: 1); and the second amino acid sequence corresponds to a human insulin alpha chain amino acid sequence (SEQ ID NO: 2); or
  (o) the second amino acid sequence comprises a variant of a human insulin alpha chain 4-20 peptide sequence (SEQ ID NO: 6), which comprises an alpha chain 4-Glu substituted by Asp; or
  (p) the insulin-related peptide comprises a first amino acid sequence comprising a human insulin beta chain 3-26 peptide sequence (SEQ ID NO: 7); or a variant thereof; and a second amino acid sequence comprising a human insulin alpha chain 6-20 peptide sequence (SEQ ID NO: 4) or a variant thereof;
  wherein the variant of human insulin beta chain 3-26 peptide sequence (SEQ ID NO: 7) has a beta chain 3-Asn substituted by Lys; and/or a beta chain 9-Ser substituted by Pro; or
  (q) the insulin-related peptide comprises the first amino acid sequence comprising a human insulin beta chain 4-27 peptide sequence (SEQ ID NO: 8) or a variant thereof; and/or the second amino acid sequence comprising a human insulin alpha chain 1-20 peptide sequence or a variant thereof;
  wherein the variant of human insulin beta chain 4-27 peptide sequence (SEQ ID NO: 8) has a beta chain 9-Ser substituted by Pro;
  and the variant of the human insulin alpha chain 1-20 peptide sequence has one or more amino acid substitutions selected from:
    an alpha chain 4-Glu substituted by Asp;
    an alpha chain 8-Thr substituted by Ser, Val, Ala, or Gly;
    an alpha chain 9-Ser substituted by Thr, Ala, or Gly;
    an alpha chain 10-Ile substituted by Leu, Val, Ala or Gly; and
    an alpha chain 18-Asn substituted by His; or
  (r) the insulin-related peptide comprises the first amino acid sequence corresponding to a human insulin beta chain amino acid sequence (SEQ ID NO: 1) or a variant thereof; and/or the second amino acid sequence corresponding to a human insulin alpha chain amino acid sequence (SEQ ID NO: 2) or a variant thereof;
  wherein the variant of the human insulin beta chain amino acid sequence (SEQ ID NO: 1) has one or more amino acid substitutions selected from:
    a beta chain 3-Asn substituted by Lys;
    a beta chain 9-Ser substituted by Pro;
    a beta chain 29-Lys substituted by Met; and
    a beta chain 30-Thr substituted by Ser or Ala; and
  the variant of the human insulin alpha chain amino acid sequence has one or more amino acid substitutions selected from:
    an alpha chain 4-Glu substituted by Asp;
    an alpha chain 8-Thr substituted by Ala;
    an alpha chain 9-Ser substituted by Gly;
    an alpha chain 10-Ile substituted by Val;
    an alpha chain 18-Asn substituted by His; and
    an alpha chain 21-Asn substituted by Gly.

8. The method of claim 1, wherein the insulin-related peptide is a recombinant human insulin-related peptide.

9. The method of claim 1, wherein the therapeutically effective amount of the insulin-related peptide is formulated as a composition further comprising an aqueous pharmaceutically acceptable carrier, which comprises at least about 30 vol. % glycerin.

10. The method of claim 9, wherein the aqueous pharmaceutically acceptable carrier further comprises a buffer.

\* \* \* \* \*